United States Patent [19]

Spitler

[11] Patent Number: 4,470,486
[45] Date of Patent: Sep. 11, 1984

[54] AUTOMATIC WEAR ADJUSTER FOR DRUM BRAKES

[75] Inventor: Wayne L. Spitler, Ludlow Falls, Ohio

[73] Assignee: General Motors Corporation, Detroit, Mich.

[21] Appl. No.: 401,843

[22] Filed: Jul. 26, 1982

[51] Int. Cl.³ .................... F16D 51/50; F16D 65/38
[52] U.S. Cl. .................... 188/79.5 P; 188/196 R; 192/111 A
[58] Field of Search .................... 188/79.5 P, 79.5 R, 188/79.5 GE, 79.5 GT, 79.5 SS, 196 R, 196 C, 196 F, 199, 200; 192/111 R, 111 A

[56] References Cited

U.S. PATENT DOCUMENTS 2,291,662  8/1942  Thibeault .................... 188/79.5 GT
2,386,913 10/1945  Sawtelle .................... 188/79.5 GT
2,822,893  2/1958  Flueler .................... 188/79.5 P
3,360,084 12/1967  Ayers, Jr. .................... 188/79.5 GT

FOREIGN PATENT DOCUMENTS 7606149 12/1976  Netherlands .................... 188/79.5 P Primary Examiner—Bruce H. Stoner, Jr.
Assistant Examiner—Robert J. Oberleitner
Attorney, Agent, or Firm—D. D. McGraw

[57] ABSTRACT

A drum brake adjuster having a spring biased lock plate cooperating with a parking brake strut having a lost motion connection with a parking brake lever. The lost motion determines the amount of shoe retraction, and the lock plate adjusts the effective length of the strut for brake shoe wear. The lock plate and its spring are mounted on one shoe web near one end of the strut, with the other strut end being connected to the parking brake lever.

7 Claims, 6 Drawing Figures

AUTOMATIC WEAR ADJUSTER FOR DRUM BRAKES

The invention relates to an adjuster for drum brakes, and more particularly to an adjuster mounted on one of the brake shoes being adjusted and cooperating with the parking brake strut or spreader bar. The adjuster has a lock plate receiving the parking brake strut therethrough and locking on the strut when parking brake force is exerted through the strut to apply the parking brake. The lock plate slides on the strut during hydraulic brake apply to allow for adjustment for brake shoe wear. A lock plate spring secured to the web of the brake shoe on which the lock plate is mounted acts against the lock plate and tends to hold the lock plate in the fully adjusted locking position. The spring has an opening through which the parking brake strut extends so that the spring guides and retains the strut end in position on the shoe web. The shoe return spring and the lock plate spring also serve as anti-rattle springs for the parking brake strut and the lock plate.

IN THE DRAWINGS

Figure 1:
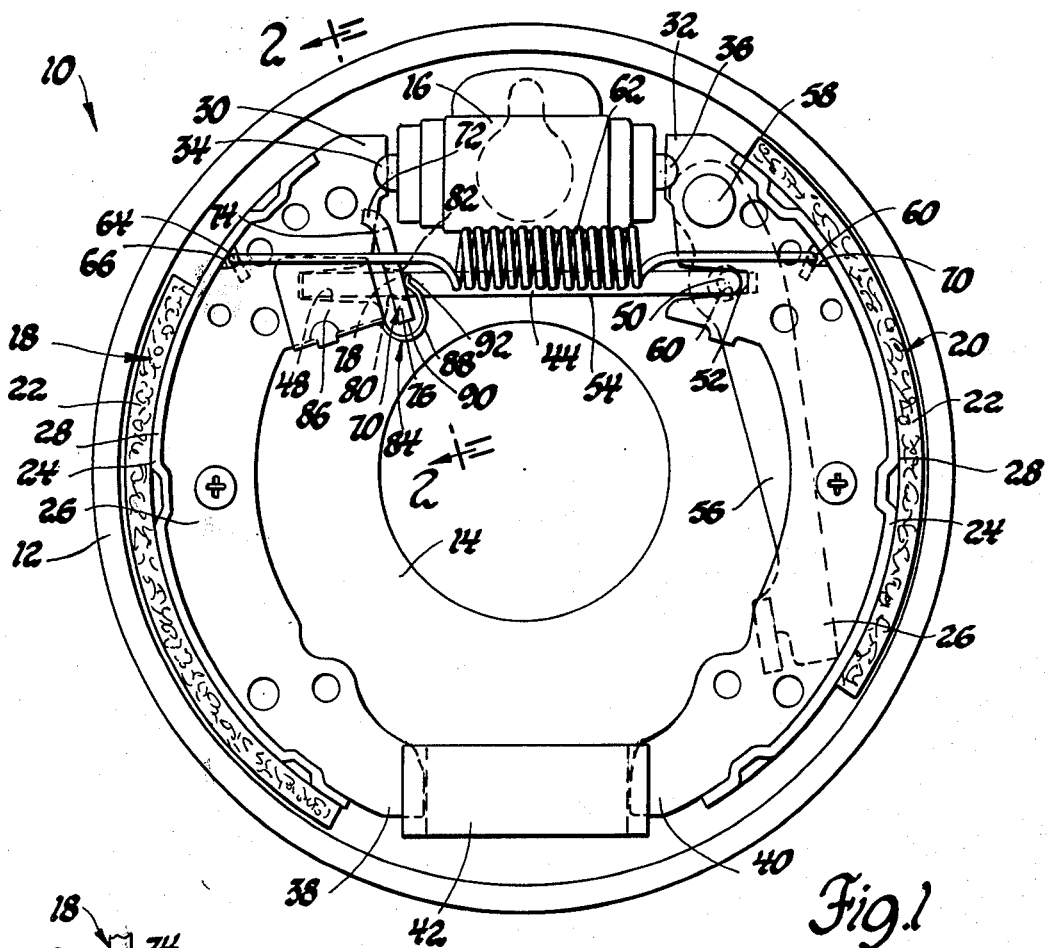
FIG. 1 is an elevation view of a drum brake mechanism for a vehicle wheel, the mechanism having a brake adjuster embodying the invention.

The drum brake assembly 10 embodying the invention has a brake drum 12 rotatable with a vehicle wheel, not shown, to be braked. A backing plate 14 is suitably secured to a non-rotatable portion of the vehicle, such as an axle housing, and supports much of the brake assembly. A wheel cylinder 16 is suitably mounted to a non-rotatable portion of the vehicle through the backing plate, as is well known in the art. Brake shoe assemblies 18 and 20 are positioned on the backing plate within drum 12 so that they may be moved into friction braking engagement with the inner surface of the drum when the brake is actuated, and may be moved out of engagement therewith when the brake is released. Each shoe assembly including a lining 22 mounted on a shoe rim 24, which in turn is secured to a shoe web 26. The shoe rim and web define the brake shoe 28. Shoe assemblies 18 and 20 have adjacent shoe web ends 30 and 32 positioned on opposite ends of wheel cylinder 16 and respectively engaged by wheel cylinder piston extensions 34 and 36. The other shoe web ends 38 and 40 engage an anchor 42 which is positioned generally opposite wheel cylinder 16 and is secured to a non-rotating part of the vehicle. The particular arrangement illustrated is that of a leading-trailing brake. If the anchor 42 is replaced by a movable assembly, the drum brake assembly would be of the duo servo type.

A parking brake strut or spreader bar 44 has one strut end 46 fitting in a recess 48 of the web 26 of brake shoe assembly 18 adjacent the shoe web end 30. The other strut end 50 fits within a similar recess 52 in the web of shoe assembly 20. The strut end 50 is bent at a right angle to the main portion 54 of the strut so that it extends laterally through recess 52. A parking brake actuating lever 56 is pivoted at 58 on the web of shoe assembly 20 immediately adjacent the shoe web end 32 and receives the bent end portion of strut end 50 therethrough in an opening 60. This opening is somewhat larger in diameter than the bent portion of strut end 50. This gives a lost motion connection providing clearance, the amount of which controls the distance the brake shoe assembly may be retracted upon brake release, as will be further described. A retraction spring 62 has one spring end 64 fitting through a hole 66 in the web of shoe assembly 18. The other retraction spring end 68 fits within a similar hole 70 of shoe assembly 20 so that the retraction spring, which is in tension, exerts retracting forces on both shoe assemblies substantially in line with the strut 44. The retraction spring therefore tends to keep strut end 50 in engagement with the outer side of opening 60 of parking brake lever 56. Spring 62 also urges strut end 46 toward further penetration of recess 48.

The lock plate 70 has a bifurcated end 72, the base of the bifurcation providing a pivot point 74. The bifurcated end fits over a portion of the web 26 of shoe assembly 18 between the recess 48 and the shoe web end 30 so that the pivot point 74 engages the web edge and the lock plate can pivot about the engaged edge and pivot point location. The lock plate has a main body 76 provided with an opening 78 therethrough through which the strut main portion 54 extends. Opening 78 is so angled relative to the locking plate that the opening edges 80 and 82 are in locking or unlocking engagement with strut 44. A lock plate spring 84 has a butterfly-like mounting portion 86 clamped over the strut end 46 and recess 48, retaining and guiding the strut end 46 in that recess. The spring 84 has a curved spring section 88 extending from the mounting portion 86 around the end 90 of lock plate 70 and terminating in a pair of fingers 92 and 94 extending on either side of strut 44 and engaging the side surface of lock plate 70 on either side of the lock plate opening 78. The spring continually urges the lock plate toward a locking position about pivot point 74 relative to strut 44. The locking angle of opening 78 and edges 80 and 82 thereof is so arranged that the strut may move rightwardly relative to locking plate 70 as seen in FIG. 1, but the plate will lock on the strut when the strut tends to move leftwardly.

As the brake assembly 10 is actuated for service brake operation, brake fluid pressure exerted in wheel cylinder 16 moves the piston extensions 34 and 36 outwardly, moving the shoe web ends 30 and 32 apart against the tension force of spring 62, causing the shoe assembly linings 22 to engage the inner surface of drum 12 and initiate braking action. Parking brake lever 56 will move with shoe assembly 20 and strut 44 will move rightwardly, as seen in FIG. 1, relative to shoe assembly 18. The strut 44 may slide through opening 78 of lock plate 70. Upon brake release, the retraction spring 62 retracts the shoe assembly towards the released position illustrated, and strut 44 moves leftwardly. The lock plate 70 locks on the strut and limits the leftward movement of the strut relative to the shoe assembly 18. Since the bent end of the strut engaged the left side of opening 60 during brake actuation, the return movement of shoe assembly 20 and parking brake lever 56 acts through the lost motion arrangement until the bent end of the strut engages the right side of opening 60 as seen in FIG. 1. Thus, the size of opening 60 relative to the size of the strut bent end 50 provides the amount of lost motion needed to establish the desired clearance between the brake linings 22 and the drum 12 as the brake is released. The lock plate 70 acts to prevent any further retraction of the shoes.

As the brake linings wear, additional expansion of the wheel cylinder 16 and the shoe web ends 30 and 32 as the brake is actuated, moving the strut 44 rightwardly relative to lock plate 70. The action of the lock plate upon brake release prevents return of the strut by this additional amount, so that the brake shoe assemblies 18 and 20 remain in the released position as determined by the lost motion connection between the strut end 50 and opening 60 as described above.

When the brake is actuated in the parking brake mode, lever 56 is pivoted clockwise as seen in FIG. 1 about pivot 58, and the strut 44 is moved leftwardly. Since the lock plate 70 is locked on the strut against leftward movement of the strut relative to the lock plate, shoe 18 immediately moves outwardly toward the drum 12. The lever reaction on pivot 58 moves shoe 20 outwardly toward the brake drum. The shoes therefore engage the drum 12 in mechanically actuated braking relation. Upon release of the parking brake mechanism, the assembly returns to the position shown in FIG. 1.

Figure 2:
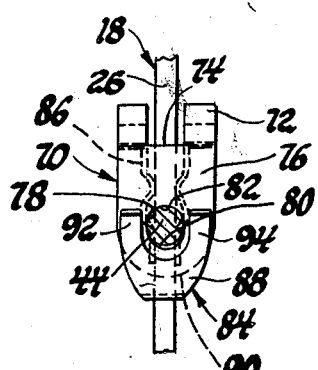
FIG. 2 is a fragmentary cross-section view of the adjuster embodying the invention, taken in the direction of arrows 2—2 of FIG. 1.
Figure 3:
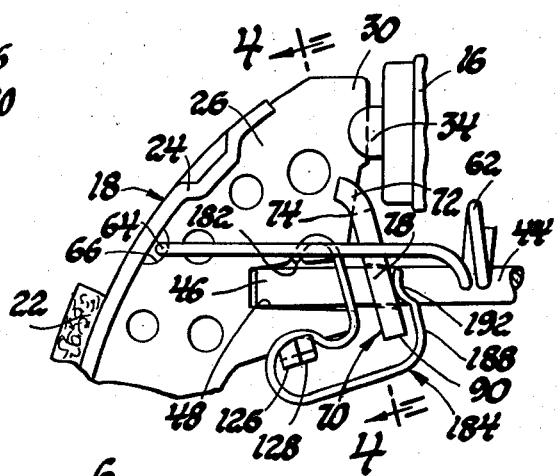
FIG. 3 is a fragmentary enlarged view, with parts broken away, of a modified portion of the brake mechanism of FIG. 1 having the adjuster embodying the invention therein.
Figure 4:
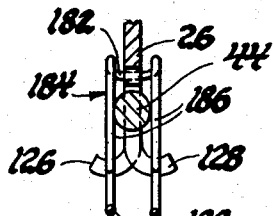
FIG. 4 is a fragmentary cross-section view of the adjuster of FIG. 3, taken in the direction of arrows 4—4 of that Figure.

The modified arrangement shown in FIGS. 3 and 4 uses a wire lock plate spring 184 instead of a stamped leaf spring as shown in FIGS. 1 and 2. The shoe web has tangs 126 and 128 formed out of the plane of the web so that spring 184 is received over the tangs and held on the web. The center portion 182 of spring 184 fits in a notch provided in the upper edge of recess 48 so that the parallel sides of the spring forming the spring mounting portion 186 are positioned on either side of the web and pass over tangs 126 and 128. These spring sides also guide and retain strut 44 in recess 48. The spring curved section 188 is composed of the two spring ends which pass around the end 90 of lock plate 70. These ends terminate at 192 on either side of the strut 44 and engage the side surface of lock plate 70 on either side of the lock plate opening 78 in a manner much like ends 92 and 94 of spring 84 in FIGS. 1 and 2. Spring 184 functions in the same manner as does spring 84.

Figure 5:
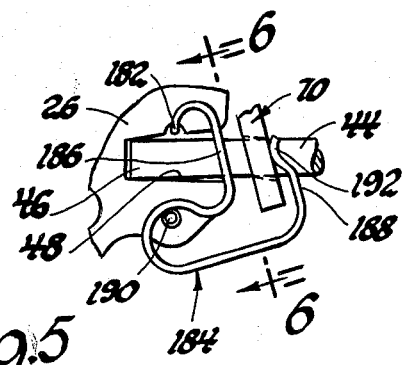
FIG. 5 is a fragmentary view, with parts broken away, of another modified adjuster, the view being generally similar to that of FIG. 3.
Figure 6:
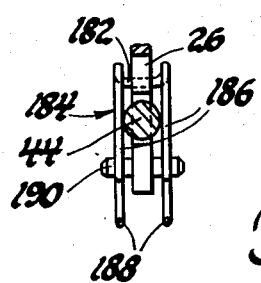
FIG. 6 is a fragmentary cross-section view of the adjuster of FIG. 5, taken in the direction of arrows 6—6 of that Figure.

The modification shown in FIGS. 5 and 6 uses spring 184 as described above. However, instead of tangs 126 and 128 being used, a roll pin 190 is press fitted through an opening provided in web 26 so that spring 184 fits over the roll pin in a manner similar to its association with tangs 126 and 128.

The embodiments of the invention in which an exclusive property or privilege is claimed are defined as follows:

1. In a drum brake having a brake drum, brake shoes movable to engage and disengage the drum, a service brake actuator, and a parking brake actuator, a brake adjuster comprising:
   a brake shoe web forming a part of one of the brake shoes and having a strut-receiving slot formed therein;
   a pivotable lock plate mounted on said shoe web and engaging said shoe web in pivotable relation, said lock plate having an opening;
   a parking brake strut extending through said lock plate opening in lock and release relation with said lock plate and having one end reciprocably received in said web slot;
   a lock plate spring having one end portion mounted on said shoe web and another end portion engaging said lock plate and yieldably urging said lock plate toward locking relation with said strut, said spring one end portion also guiding said strut relative to said shoe web;
   said lock plate and said strut and said spring cooperating to permit relative sliding movement between said strut and said lock plate in the release relation therebetween with movement of said strut away from said shoe web, and locking said lock plate to said strut to prevent relative sliding movement therebetween and provide a force transfer path from said strut through said lock plate to said shoe web with attempted movement of said strut toward said shoe web, establishing an effective strut length which increases with brake shoe wear indicated by movement of said strut away from said shoe web during service brake actuation;
   and a parking brake actuating lever attached to said strut to exert brake actuating force therethrough and through said lock plate and said shoe web to move said one of brake shoes, the connection between said strut and said parking brake actuating lever being a limited lost motion connection wherein the amount of lost motion provided therein controls the amount of retraction of the brake shoes upon brake release.

2. In a drum brake having a brake drum, brake shoes movable to engage and disengage the drum, a service brake actuator, and a parking brake actuator, a brake adjuster comprising:
   a brake shoe web forming a part of one of the brake shoes;
   a pivotable lock plate mounted on said shoe web and engaging said shoe web in pivotable relation, said lock plate having an opening;
   a parking brake strut extending through said lock plate opening in lock and release relation with said lock plate;
   a lock plate spring mounted on said shoe web and engaging said lock plate and yieldably urging said lock plate toward locking relation with said strut, said lock plate spring having means fitting over said shoe web and the end of said strut and gripping said shoe web to hold said spring thereon, said means guiding and retaining the end of said strut in relation to said shoe web and preventing rattling therebetween;
   said lock plate and said strut and said spring cooperating to permit relative sliding movement between said strut and said lock plate in the release relation therebetween with movement of said strut away from said shoe web, and locking said lock plate to said strut to prevent relative sliding movement therebetween and provide a force transfer path from said strut through said lock plate to said shoe web with attempted movement of said strut toward said shoe web, establishing an effective strut length which increases with brake shoe wear indicated by movement of said strut away from said shoe web during service brake actuation;

and a parking brake actuating lever attached to said strut to exert brake actuating force therethrough and through said lock plate and said shoe web to move said one of brake shoes, the connection between said strut and said parking brake actuating lever being a limited lost motion connection wherein the amount of lost motion provided therein control the amount of retraction of the brake shoes upon brake release.

3. In a drum brake having a brake drum, brake shoes movable to engage and disengage the drum, a service brake actuator, and a parking brake actuator, a brake adjuster comprising:

a brake shoe web forming a part of one of the brake shoes;

a pivotable lock plate mounted on said shoe web and engaging said shoe web in pivotable relation, said lock plate having an opening;

a parking brake strut extending through said lock plate opening in lock and release relation with said lock plate;

a lock plate spring mounted on said shoe web, said lock plate spring being a sheet metal spring having a channel-like body the sides of which fit over said shoe web and the end of said strut and grip said shoe web to hold said spring thereon, said body sides guiding and retaining the end of said strut in relation to said shoe web and preventing rattling therebetween, and a spring finger extending from said body and around a part of said lock plate and being bifurcated so as to receive said strut with the bifurcated outer end of said finger engaging said lock plate adjacent said opening on either side of said strut and yieldably urging said lock plate toward locking relation with said strut;

said lock plate and said strut and said spring cooperating to permit relative sliding movement between said strut and said lock plate in the release relation therebetween with movement of said strut away from said shoe web, and locking said lock plate to said strut to prevent relative sliding movement therebetween and provide a force transfer path from said strut through said lock plate to said shoe web with attempted movement of said strut toward said shoe web, establishing an effective strut length which increases with brake shoe wear indicated by movement of said strut away from said shoe web during service brake actuation;

and a parking brake actuating lever attached to said strut to exert brake actuating force therethrough and through said lock plate and said shoe web to move said one of brake shoes, the connection between said strut and said parking brake actuating lever being a limited lost motion connection wherein the amount of lost motion provided therein controls the amount of retraction of the brake shoes upon brake release.

4. In a drum brake having a brake drum, brake shoes movable to engage and disengage the drum, a service brake actuator, and a parking brake actuator, a brake adjuster comprising:

a brake shoe web forming a part of one of the brake shoes;

a pivotable lock plate mounted on said shoe web and engaging said shoe web in pivotable relation, said lock plate having an opening;

a parking brake strut extending through said lock plate opening in lock and release relation with said lock plate;

a lock plate spring mounted on said shoe web, said lock plate spring being made of spring wire having a center portion engaging said web and ends extending in parallel planes on either side of said shoe web, said web having mounting means thereon over which said extending ends fit to hold said spring on said shoe web with said spring guiding and retaining the end of said strut in relation to said shoe web, said spring ends further extending around a part of said lock plate and engaging said lock plate adjacent said opening on either side of strut and yieldably urging said lock plate toward locking relation with said strut;

said lock plate and said strut and said spring cooperating to permit relative sliding movement between said strut and said lock plate in the release relation therebetween with movement of said strut away from said shoe web, and locking said lock plate to said strut to prevent relative sliding movement therebetween and provide a force transfer path from said strut through said lock plate to said shoe web with attempted movement of said strut toward said shoe web, establishing an effective strut length which increases with brake shoe wear indicated by movement of said strut away from said shoe web during service brake actuation;

and a parking brake actuating lever attached to said strut to exert brake actuating force therethrough and through said lock plate and said shoe web to move said one of brake shoes, the connection between said strut and said parking brake actuating lever being a limited lost motion connection wherein the amount of lost motion provided therein controls the amount of retraction of the brake shoes upon brake release.

5. The adjuster of claim 4 wherein said shoe web mounting means is formed by oppositely bent tabs lanced from said shoe web and extending substantially transversely of said shoe web.

6. The adjuster of claim 4 wherein said shoe web mounting means is formed by a pin extending transversely through said shoe web on both sides thereof.

7. In a drum brake assembly having a drum, a pair of opposed arcuately extending brake shoe assemblies engageable in braking relation with the drum and including shoe webs and adjacent shoe web ends, brake actuating means between two adjacent shoe web ends for expanding the brake shoe assemblies into engagement with the drum to actuate the brake assembly, retraction spring means attached to the shoe webs and retracting the brake shoe assemblies away from engagement with the drum upon brake assembly deactuation, a parking brake strut having its ends reciprocably received in slots in the shoe webs and a parking brake lever pivoted on one shoe web and on one end of the strut to expand the brake shoe assemblies into engagement with the drum to actuate the brake assembly independently of actuation by the brake actuating means, the improvement comprising:

a lock plate received about the parking brake strut adjacent the other shoe web in pivotal lock and release relation, said lock plate having a bifurcated end receiving the other shoe web and providing a lock plate pivot point on the edge of the other shoe web at the juncture of the bifurcated end;

and a lock plate spring having one portion mounted on the other shoe web and received on either side of the web slot therein and on either side of the strut end in that web slot to guide the strut end relative to the shoe web, said lock plate spring having another portion engaging said lock plate so as to continually urge said lock plate toward lock relation with the strut;

said lock plate permitting movement of the strut away from the other shoe web during brake actuation by the brake actuating means, and locking with said strut to transmit force from said strut to the other shoe web when parking brake actuating force is exerted through said strut by actuating movement of said parking brake lever, said strut having a lost motion attachment to said parking brake lever so that only sufficient movement of the strut relative to said parking brake lever is permitted upon brake deactuation to assure brake shoe assembly clearance relative to the drum while the brake assembly is deactuated.

* * * * *